United States Patent
Delaviz et al.

(10) Patent No.: US 11,447,616 B2
(45) Date of Patent: Sep. 20, 2022

(54) BLOWING AGENT COMPOSITIONS FOR INSULATING FOAMS

(71) Applicant: Owens Corning Intellectual Capital, LLC, Toledo, OH (US)

(72) Inventors: Yadollah Delaviz, Lewis Center, OH (US); Chase Boudreaux, Canton, OH (US); Xiangmin Han, Stow, OH (US); S. Thomas Brammer, Kent, OH (US); Barbara Ann Fabian, Medina, OH (US); Mitchell Zane Weekley, Tallmadge, OH (US); Jeffrey Thomas, Mogadore, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 71 days.

(21) Appl. No.: 16/425,359

(22) Filed: May 29, 2019

(65) Prior Publication Data

US 2019/0367697 A1 Dec. 5, 2019

Related U.S. Application Data

(60) Provisional application No. 62/677,248, filed on May 29, 2018.

(51) Int. Cl.
  *C08J 9/14* (2006.01)
(52) U.S. Cl.
  CPC .............. *C08J 9/149* (2013.01); *C08J 9/141* (2013.01); *C08J 9/146* (2013.01); *C08J 2201/03* (2013.01); *C08J 2203/06* (2013.01); *C08J 2203/14* (2013.01); *C08J 2203/162* (2013.01); *C08J 2203/182* (2013.01); *C08J 2325/06* (2013.01)
(58) Field of Classification Search
  CPC .............. C08J 2203/14; C08J 2203/162; C08J 2203/18; C08J 2203/182; C08J 9/141; C08J 9/144; C08J 9/149; C08J 2425/00–18; C08L 25/00–18
  See application file for complete search history.

(56) References Cited

U.S. PATENT DOCUMENTS

| | | | |
|---|---|---|---|
| 4,640,933 A | 2/1987 | Park | |
| 7,972,524 B2 | 7/2011 | Robin | |
| 8,198,340 B2 | 6/2012 | Vo et al. | |
| 8,754,143 B2 | 6/2014 | Delaviz et al. | |
| 9,453,090 B2 | 9/2016 | Handa et al. | |
| 2010/0163776 A1* | 7/2010 | Robin | A62D 1/0057 252/2 |
| 2011/0144216 A1 | 6/2011 | Hulse et al. | |
| 2011/0144221 A1 | 6/2011 | Delaviz et al. | |
| 2011/0196054 A1 | 8/2011 | Delaviz et al. | |
| 2011/0288192 A1 | 11/2011 | Van Horn | |
| 2012/0283339 A1 | 11/2012 | Bowman et al. | |
| 2013/0040122 A1 | 2/2013 | Annan et al. | |
| 2013/0245142 A1 | 9/2013 | Okuda et al. | |
| 2014/0194544 A1 | 7/2014 | Bowman et al. | |
| 2014/0275308 A1 | 9/2014 | Annan et al. | |
| 2014/0316020 A1 | 10/2014 | Han et al. | |
| 2015/0165658 A1 | 6/2015 | Bowman et al. | |
| 2015/0166752 A1 | 6/2015 | Scholz et al. | |
| 2015/0299414 A1 | 10/2015 | Van Horn et al. | |
| 2016/0009886 A1 | 1/2016 | Han et al. | |
| 2016/0017111 A1 | 1/2016 | Delaviz et al. | |
| 2016/0237233 A1 | 8/2016 | Hood et al. | |
| 2016/0326331 A1* | 11/2016 | Hamajima | C08J 9/144 |
| 2017/0002160 A1 | 1/2017 | Scholz et al. | |
| 2018/0327565 A1* | 11/2018 | Kontomaris | C08L 25/06 |
| 2018/0334547 A1* | 11/2018 | Loh | C08J 9/149 |

FOREIGN PATENT DOCUMENTS

JP  2017088650 A  *  5/2017
WO  2016168041 A1     10/2016

OTHER PUBLICATIONS

Machine Translation of JP2017088650A. May 25, 2017. (Year: 2017).*
Hajova et al., "Experimental study of sorption and diffusion of n-pentane in polystyrene," Journal of Chemical & Engineering Data. Mar. 5, 2013;58(4):851-65, abstract only.
Lee et al., "Extruded open-cell foams using two semicrystalline polymers with different crystallization temperatures," Industrial & engineering chemistry research Jan. 4, 2006;45(1):175-81, abstract only.
Salejova et al., "Dynamics of foaming of polystyrene particles," Macromol. Sympos. 2006;243(1):233-46, abstract only.
Zepnik et al., "Foam extrusion behavior, morphology, and physical foam properties of organic cellulose ester," Journal of Materials Research. Sep. 14, 2013;28(17):2394-400, abstract only.
International Search Report and Written Opinion from PCT/US19/34382 dated Aug. 15, 2019.
"R-value (insulation)," Wikipedia, May 9, 2018, p. 1 para 4, p. 10 table [retrieved 2019 Jul. 2019 via https://en.wikipedia.org/w/index.php?title=R-value_(insulation)&oldid=840345839>].
Office Action from Chinese Application No. 201980035833.2 dated Feb. 8, 2022.

* cited by examiner

*Primary Examiner* — Stephen E Rieth
(74) *Attorney, Agent, or Firm* — Calfee, Halter & Griswold LLP

(57) ABSTRACT

Disclosed is a blowing agent composition comprising a hydrofluoroolefins (HFO) and a branched hydrocarbon, and a foamable polymer composition comprising the blowing agent composition. Also disclosed is a method of making a polymer foam utilizing a blowing agent composition comprising an HFO and a branched hydrocarbon.

3 Claims, 7 Drawing Sheets

BLOWING AGENT COMPOSITIONS FOR INSULATING FOAMS

CROSS-REFERENCE TO RELATED APPLICATIONS

This application claims priority to and any benefit of U.S. Provisional Application No. 62/677,248, filed on May 29, 2018, the content of which is incorporated herein by reference in its entirety.

FIELD OF DISCLOSURE

This invention relates to blowing agent compositions for insulating foams made from thermoplastic polymers. This invention further relates to insulating foams made utilizing these blowing agent compositions.

BACKGROUND OF THE INVENTION

In the past, insulating foams have been made utilizing halogenated blowing agents to create gas-filled cells within the insulating foams. Chlorofluorocarbons (CFCs) and chlorofluorohydrocarbons (HCFCs) were among the earliest blowing agents. However, suspected environmental concerns about chlorinated blowing agents, including possible ozone depletion in the upper atmosphere, led to the development of blowing agents that were considered less damaging to the environment. These later blowing agents included fluorocarbons (FCs) and fluorohydrocarbons (HFCs).

Recently, newer hydrofluoroolefins (HFOs) have been developed. HFO blowing agents are believed to be more environmentally friendly than traditional halogenated blowing agents. For example, HFOs are believed to have reduced Ozone Depletion Potential (ODP) and reduced Global Warming Potential (GWP) compared to traditional FC and HFC halogenated blowing agents.

Other than halogenated blowing agents, other types of blowing agents have been investigated. For example, hydrocarbons such as pentane, hexane, cyclopentane and similar compounds have also been considered as blowing agents. These hydrocarbons are highly flammable and volatile, thereby raising both safety concerns and concerns about the emission of volatile organic compounds (VOCs). Carbon dioxide ($CO_2$) is an attractive candidate as a blowing agent, from both the environmental and economic standpoints. Successfully using $CO_2$ as a blowing agent is challenging due to the relatively low solubility, high diffusivity and poor processability of $CO_2$ in the polymers typically used as the matrix polymers of insulating foams. $CO_2$ also has an increased thermal conductivity relative to that of HCFCs and HFCs, with $CO_2$-blown foam exhibiting about 10-20% lower insulation values than corresponding foams produced with HCFCs or HFCs.

To ensure that an insulating foam has the desired properties (e.g., low density, good thermal resistance, etc.), it is important that the blowing agent be sufficiently soluble in the polymer matrix of the insulating foam. It has been found that HFO blowing agents alone may not be sufficiently soluble in the polymer matrix of the insulating foam, resulting in insulating foams that are too dense or which allow unacceptably high thermal conductivity. To improve the properties of the resulting insulating foam, blowing agent compositions containing combinations of HFOs with HCFCs, HFCs, carbon dioxide, water, and other such mixtures have been attempted, with mixed results.

SUMMARY OF THE INVENTION

The objectives of the present invention include improved blowing agent compositions comprising an HFO and a branched hydrocarbon. The objectives further include a foamable polymer composition incorporating the improved blowing agent, and an improved method of making polymer foams using the improved blowing agent.

In an exemplary embodiment of the invention, a blowing agent composition is provided comprising a hydrofluoroolefin (HFO) and a branched hydrocarbon. In some exemplary embodiments, the blowing agent contains essentially no water.

In an exemplary embodiment of the invention, a foamable polymer composition is provided comprising a matrix polymer and a blowing agent composition comprising an HFO and a branched hydrocarbon. In some exemplary embodiments, the foamable polymer composition contains essentially no water.

In an exemplary embodiment of the invention, a method of manufacturing a polymer foam is provided, comprising: melting a matrix polymer; mixing a blowing agent composition comprising an HFO and a branched hydrocarbon with the matrix polymer melt to form a foamable polymer composition; and extruding the foamable polymer composition to form a polymer foam. In some exemplary embodiments, the foamable polymer composition contains essentially no water.

DESCRIPTION OF THE DRAWINGS

Example embodiments of the invention will be apparent from the more particular description of certain example embodiments of the invention provided below and as illustrated in the accompanying drawings.

Figure 1:
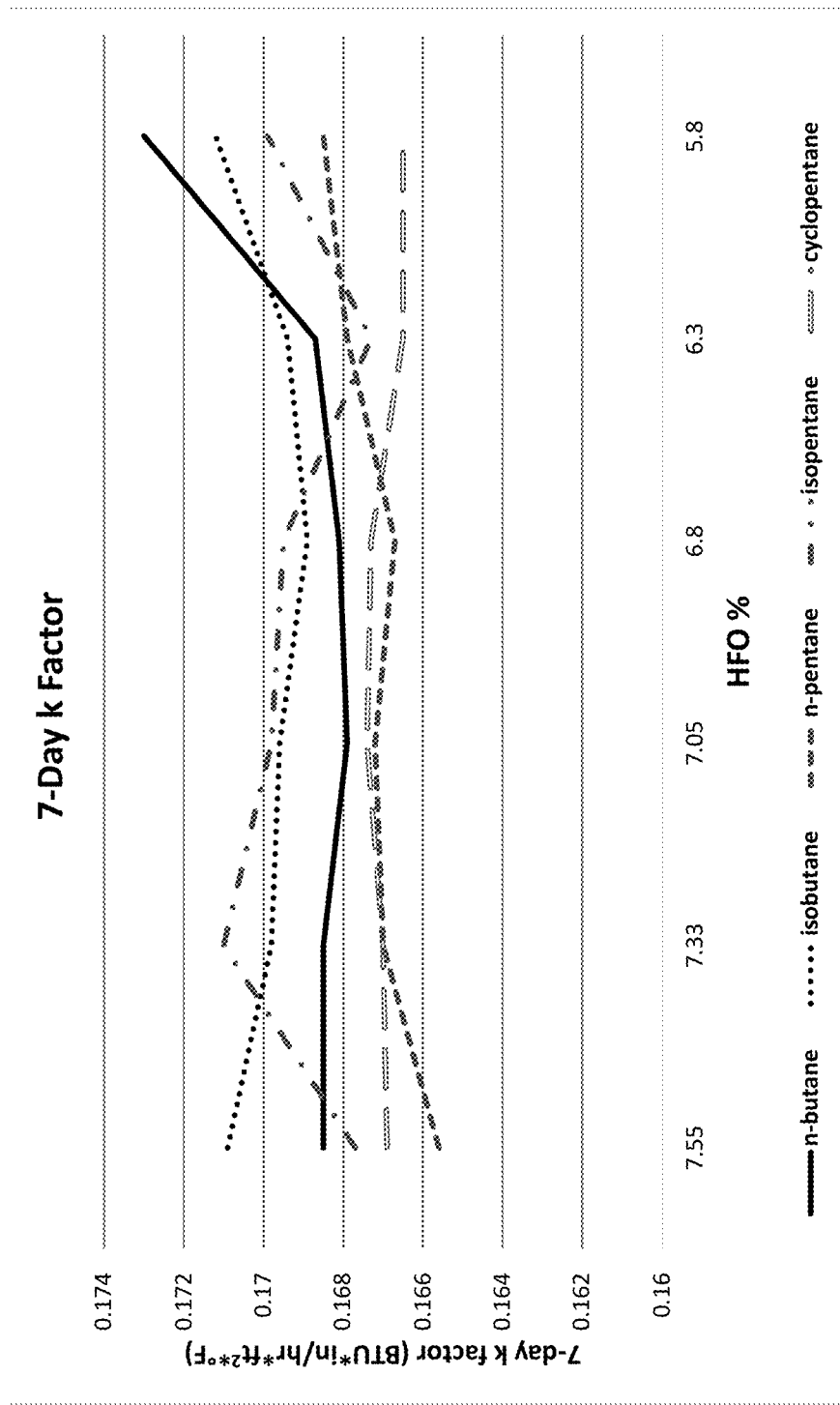
FIG. 1 is a graph of the thermal insulating properties for foam formulations comprising various blowing agent compositions after 7 days aging.

These drawings have been provided to assist in the understanding of the example embodiments of the invention as described in more detail below and should not be construed as unduly limiting the invention.

DETAILED DESCRIPTION

A polymer foam composition, along with a method for making polymer foam, is described in detail herein. The composition and method for making polymer foam disclosed herein includes blowing agent composition comprising a hydrofluoroolefin (HFO) and a branched hydrocarbon. In some exemplary embodiments, the blowing agent contains essentially no water or carbon dioxide. The resulting polymer foam has reduced thermal conductivity, and therefore improved insulation properties, when compared to blowing agents comprising HFO and linear hydrocarbons. These and other features of the polymer foam, as well as some of the many optional variations and additions, are described in detail hereafter.

Unless defined otherwise, all technical and scientific terms used herein have the same meaning as commonly understood by one of ordinary skill in the art to which the invention belongs. Any methods and materials similar or equivalent to those described herein can be used in the practice or testing of the present invention. Any references cited herein, including published or corresponding U.S. or foreign patent applications, issued U.S. or foreign patents, or any other references, are each incorporated by reference in their entireties, including all data, tables, figures, and text presented in the cited references.

As used in the description of the invention and the appended claims, the singular forms "a," "an," and "the" are intended to include the plural forms as well, unless the context clearly indicates otherwise. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

As used herein, unless specified otherwise, the values of the constituents or components of the polymer foam, the flame retardant composition, or other compositions are expressed in weight percent or % by weight of each ingredient in the composition. The values provided include up to and including the endpoints given. Unless otherwise specified, the terms "% by weight" and "wt. %" are used interchangeably and are meant to indicate a percentage based on 100% of a total weight. In some embodiments, the amount of blowing agent(s) is given in terms of moles/100 g, which is meant to indicate the number of moles of the specified blowing agent per 100 grams of matrix polymer.

As used herein, the term "polymer" is generic to the terms "homopolymer," "copolymer," "terpolymer," and combinations of homopolymers, copolymers, and/or terpolymers.

As used herein, the term "matrix polymer" refers to the polymer or polymer mixture forming the bulk of the foamable polymer composition and the polymer foam product. The matrix polymer provides strength, flexibility, toughness, and durability to the final product.

As used herein, the term "matrix polymer composition" refers to a composition comprising the matrix polymer(s) with other optional additives, such as stabilizers, processing aids, colorants, fire retardants, etc.

As used herein, the term "blowing agent" refers to a liquid or gaseous compound or mixture which, when mixed with a molten matrix polymer composition under pressure (such as the pressure within an extruder), forms a foamable polymer composition, and which converts to tiny pockets of gas when the composition is released from pressure, thereby causing the foamable polymer composition to foam. As used herein, the term "co-blowing agent" refers to a second (third, fourth, etc.) blowing agent in a blowing agent composition.

As used herein, the term "branched hydrocarbon" refers to a compound consisting of carbon and hydrogen atoms, where the carbon atoms are arranged in a branched rather than a linear or cyclic conformation. Exemplary branched hydrocarbons include isobutane, isopentane, neopentane, isohexane, 3-methylpentane, 2,3-dimethylbutane, neohexane, isoheptane, 3-methylhexane, 2,2-dimethylpentane, 2,3-dimethylpentane, 2,4-dimethylpentane, 3,3-dimethylpentane, 3-ethylpentane, and 2,2,3-trimethylbutane.

The general procedure utilized in the preparation of extruded synthetic foam bodies generally includes the steps of melting a matrix polymer composition, then incorporating a blowing agent composition into the polymer melt to form a foamable polymer composition, under conditions that provide for the thorough mixing of the blowing agent composition and the matrix polymer while preventing the foamable polymer composition from foaming prematurely, e.g., under pressure. Other additives (e.g., stabilizers, processing aids, colorants, fire retardants, etc.) may also be added into the foamable polymer composition. This foamable polymer composition is then typically extruded through a single or multi-stage extrusion die to cool and reduce the pressure on the foamable polymer composition, allowing the foamable polymer composition to foam and produce a foamed product. As will be appreciated, the relative quantities of the polymer(s), blowing agent(s) and additives in the foamable polymer composition, as well as the temperature and the manner in which the pressure is reduced, may affect the qualities and properties of the resulting foam product.

Blowing Agent Composition

In selecting a blowing agent composition, the solubility of the blowing agent composition in the matrix polymer is an important consideration. For example, the combination of pentane and a CFC such as Freon 11 and 12 is partially soluble in PS and has been used for generating PS foams that exhibited a generally acceptable appearance and physical properties such as surface finish, cell size and distribution, orientation, shrinkage and stiffness. Fluorocarbons (FCs) and hydrofluorocarbons (HFCs), such as 1,1,1,2-tetrafluoroethane (HFC-134a) and 1,1-difluoroethane (HFC-152a), are thought to be much more ozone friendly than CFCs, but they tend to be less soluble in PS. Newer hydrofluoroolefin (HFO) blowing agents are believed to be more environmentally friendly than traditional halogenated blowing agents. However, many HFOs, such as tetrafluoropropenes, have poor solubility in PS. When these HFOs are used as blowing agents without a co-blowing agent to make PS foam, the HFO tends to remain undissolved in the PS matrix, which creates large blow-holes and other defects in the foam product during the extrusion of the foamable polymer composition. The poor solubility of HFO blowing agents in PS may also detrimentally impact the long-term insulating properties of the foam.

HFO blowing agents with co-blowing agents, such as hydrocarbons, hydrofluorocarbons, carbon dioxide, and water, have been studied to determine if the co-blowing agents improve the solubility of HFO in the matrix polymer. Hydrocarbons are soluble in PS, and are thought to improve the solubility of HFO in PS as well.

The inventors have discovered that HFO blowing agent compositions with branched hydrocarbon co-blowing agents unexpectedly form foams with improved insulating properties, when compared to foams made with blowing agent compositions comprising HFO with linear hydrocarbons, cyclic hydrocarbons, or HFC co-blowing agents, excluding branched hydrocarbons. Without wishing to be bound by theory, the inventors believe that branched hydrocarbons are superior co-blowing agents because of the compactness of the branched hydrocarbon molecule. The pendant branched groups (e.g., methyl groups) on branched hydrocarbons means that these molecules are more compact and have a smaller surface area than do the molecules of linear or cyclic hydrocarbons with the same number of carbon atoms. The intermolecular attractive forces, which depend on the surface area of a molecule, are also smaller between branched hydrocarbons than between linear or cyclic hydrocarbons with the same number of carbon atoms. Consequently, the boiling points of branched hydrocarbons are less than the corresponding linear or cyclic hydrocarbons, and the lower boiling points result in higher vapor pressure for the branched hydrocarbons. The higher vapor pressure of the branched hydrocarbons leads to more branched hydrocarbon gas in each cell of the insulating foam. Because a blowing agent must be in gaseous form to be an effective insulating gas, blowing agents with higher vapor pressures, and therefore more gas in the foam cells, tend to have improved insulating properties.

The hydrofluoroolefin blowing agent in the blowing agent composition of the present invention may include, for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluoro-1-butene; 3,4,4,4-tetrafluoro-1-butene; octafluoro-2-pentene (HFO-1438); 1,1,3,3,3-pentafluoro-2-methyl-1-propene; octafluoro-1-butene; 2,3,3,4,4,4-hexafluoro-1-butene; 1,1,1,4,4,4-hexafluoro-2-butene (HFO-1336m/z); 1,2-difluoroethene (HFO-1132); 1,1,1,2,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1, 1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene. In some exemplary embodiments, the blowing agent or co-blowing agents include HFO-1234ze.

The branched hydrocarbon co-blowing agent in the blowing agent composition of the present invention may include, for example, branched butanes, pentanes, hexanes, and heptanes. Preferred branched hydrocarbon co-blowing agents include, but are not limited to, isobutane, isopentane, neopentane, isohexane, 3-methylpentane, 2,3-dimethylbutane, neohexane, isoheptane, 3-methylhexane, 2,2-dimethylpentane, 2,3-dimethylpentane, 2,4-dimethylpentane, 3,3-dimethylpentane, 3-ethylpentane, and 2,2,3-trimethylbutane. In some exemplary embodiments, the blowing agent or co-blowing agents include isobutane, isopentane, or combinations thereof.

In certain exemplary embodiments, the HFO blowing agent comprises from about 14% to about 89% by weight of the total weight of the blowing agent composition, including from about 15% to about 80%, including from about 20% to about 75%, including from about 25% to about 70%, including from about 30% to about 65%, including from about 35% to about 60%, and including from about 38% to about 55% by weight of the total weight of the blowing agent composition. In some exemplary embodiments, the HFO blowing agent comprises less than 50% by weight of the total blowing agent composition.

In certain exemplary embodiments, the branched hydrocarbon co-blowing agent comprises from about 5.0% to about 85% by weight of the total weight of the blowing agent composition, including from about 7.0% to about 50%, including from about 9.0% to about 45%, including from about 10% to about 40%, including from about 12% to about 35%, including from about 12.3% to about 32%, including about 12.5% to about 30%.

In certain exemplary embodiments, the blowing agent composition further includes at least one secondary co-blowing agent, such as one or more hydrofluorocarbons ("HFC"), hydrochlorofluorocarbons ("HCFO"), carbon dioxide, and water. In some exemplary embodiments, the blowing agent composition includes two or more secondary co-blowing agents, such as a hydrofluorocarbon and carbon dioxide. In some exemplary embodiments, the blowing agent composition is free of a secondary co-blowing agent. In some exemplary embodiments, the blowing agent formulation is free of carbon dioxide and/or water. In various exemplary embodiments, the blowing agent composition is free of a hydrofluorocarbon.

In some exemplary embodiments, the secondary co-blowing agent may comprise one or more hydrofluorocarbons. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HF0-1234ze), pentafluoro-ethane (HFC-125), fluoroethane (HFC-161), 1,1,2,2,3,3-hexafluoropropane (HFC-236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245ea), 1,1,1,2,3 pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof. In some exemplary embodiments, the secondary co-blowing agent comprises HFC-152a.

The secondary co-blowing agent may also comprise one or more hydrochlorofluoroolefins (HCFO), such as HCFO-1233; 1-chloro-1,2,2,2-tetrafluoroethane (HCFC-124); 1,1-dichloro-1-fluoroethane (HCFC-141b); 1, 1, 1, 2-tetrafluoroethane (HFC-134a); 1,1,2,2-tetrafluoroethane (HFC-134); 1-chloro-1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); and dichlorofluoromethane (HCFC-22).

The term "HCFO-1233" is used herein to refer to all trifluoromonochloropropenes. Among the trifluoromonochloropropenes are included both cis- and trans-1,1,1-trifluo-3,chloropropene (HCFO-1233zd or 1233zd). The term "HCFO-1233zd" or "1233zd" is used herein generically to refer to 1,1,1-trifluo-3-chloro-propene, independent of whether it is the cis- or trans-form. The terms "cis HCFO-1233zd" and "trans HCFO-1233zd" are used herein to describe the cis- and trans-forms or trans-isomer of 1,1,1-trifluo,3-chlororopropene, respectively.

In certain exemplary embodiments, the secondary co-blowing agent comprises from 0 to about 90% by weight off the blowing agent composition, including about 0.5% to about 89% by weight of the total weight of the blowing agent composition, including from about 1% to about 50%, including from about 3% to about 25%, including from about 5% to about 20%, including from about 7% to about 15%, and including from about 7.5% to about 13% by weight of the total weight of the blowing agent composition.

In certain exemplary embodiments, the total blowing agent composition is present in an amount from about 2% to about 15% by weight, and in some embodiments, from about 3% to about 10% by weight, or from about 4% to about 9% by weight (based upon the total weight of the foamable composition, excluding the blowing agent composition). In some exemplary embodiments, the total blowing agent composition is present in an amount from about 6.8 to about 8.0% by weight, including about 7.3 to about 7.9% by weight, based on the total weight of the foamable composition, excluding the blowing agent composition.

In certain exemplary embodiments, the HFO blowing agent comprises from about 1% to about 8% by weight of the total weight of all ingredients in the foamable composition, including from about 1.5% to about 7.5%, including from about 2% to about 7%, including from about 2.5% to about 6.5%, including from about 3% to about 6%, including from about 3.5% to about 5.5%, including from about 4% to about 5%, and including about 4.5% by weight of the total weight of all ingredients in the foamable composition.

In certain exemplary embodiments, the HFO comprises from about 0.004 moles/100 g to about 0.140 moles/100 g of the matrix polymer, including from about 0.007 moles/100 g to about 0.125 moles/100 g, including from about 0.009 moles/100 g to about 0.120 moles/100 g, including from about 0.010 moles/100 g to about 0.108 moles/100 g, including from about 0.015 moles/100 g to about 0.0999 moles/100 g, including from about 0.017 moles/100 g to about 0.091 moles/100 g, including from about 0.019 moles/100 g to about 0.085 moles/100 g, and including about 0.020 to about 0.075 moles/100 g of the matrix polymer. In some exemplary embodiments, the HFO blowing agent comprises less than 0.05 moles/100 grams of matrix polymer, including less than 0.045 moles/100 g, less than about 0.03 moles/100 g, less than 0.025 moles/100 g, less than 0.023 moles/100 grams, and 0.021 moles/100 grams matrix polymer.

In certain exemplary embodiments, the branched hydrocarbon co-blowing agent comprises from about 0.05% to about 6% by weight of the total weight of all ingredients in the foamable composition, including from about 0.1% to about 5.5%, including from about 0.5% to about 5%, including from about 0.8% to about 4.5%, including from about 0.9% to about 4%, and including about 1.0% by weight of the total weight of all ingredients. In certain exemplary embodiments, the branched hydrocarbon co-blowing agent comprises from about 0.0005 moles/100 g to about 0.150 moles/100 g of the matrix polymer, including from about 0.0010 mole/100 g to about 0.10 moles/100 g, including from about 0.0050 moles/100 g to about 0.085 moles/100 g, including from about 0.0080 moles/100 g to about 0.078 moles/100 g, including from about 0.009 moles/100 g to about 0.065 moles/100 g, and including about 0.0100 to about 0.020 moles/100 g of the matrix polymer.

In certain exemplary embodiments, the one or more secondary co-blowing agent comprises from about 0.05% to about 6% by weight of the total weight of all ingredients, in the foamable composition, including from about 0.1% to about 5.5%, including from about 0.5% to about 5%, including from about 0.8% to about 4.5%, including from about 0.9% to about 4%, and including about 1.0% by weight of the total weight of all ingredients.

Matrix Polymer

The matrix polymer forms the bulk of the foamable polymer mixture and provides strength, flexibility, toughness, and durability to the final product. The matrix polymer is not particularly limited, and generally, any polymer capable of being foamed may be used as the matrix polymer in the foamable polymer mixture. The matrix polymer may be a thermoplastic or thermoset polymer. In some embodiments, the matrix polymer may comprise a single polymer. In some embodiments, the matrix polymer may comprise a blend of two or more polymers. In some embodiments, the matrix polymer may be selected to provide sufficient mechanical strength to the final polymer foamed product. In some embodiments, the matrix polymer may be selected to be compatible with the process utilized to form final polymer foam product. In some embodiments, the matrix polymer is chemically stable, that is, generally non-reactive, within the expected temperature range experienced by the matrix polymer during formation and subsequent use in a polymer foam.

The matrix polymer may be present in the foamable polymer mixture in an amount from at least about 50 wt. % (based on the total weight of all ingredients excluding the blowing agent composition), in an amount from about 60 wt. % to about 100 wt. %, in an amount from about 70 wt. % to about 99 wt. %, in an amount from about 75 wt. % to about 98 wt. %, in an amount from about 80 wt. % to about 96 wt. %, or in an amount from about 85 wt. % to about 95 wt. %. In certain exemplary embodiments, the matrix polymer may be present in an amount from about 80 wt. % to about 100 wt. %.

Non-limiting examples of suitable matrix polymers include alkenyl aromatic polymers, styrenic polymers, polystyrene (PS), styrenic copolymers, styrenic block copolymers, copolymers of styrene and butadiene, styrene acrylonitrile (SAN), acrylonitrile butadiene styrene, acrylic/styrene/acrylonitrile block terpolymer (ASA), styrene maleic anhydride copolymer (SMA), styrene methyl methacrylate copolymer (SMMA), polyolefins, polyethylene (PE), polypropylene (PP), copolymers of ethylene and propylene, copolymers of vinyl acetate and ethylene, polyvinyl chloride (PVC), chlorinated polyvinyl chloride (CPVC), polycarbonates, polyisocyanurates, polyesters, polyethylene terephthalate (PET), polyacrylic acid esters, polymethylmethacrylate (PMMA), polyphenylene oxide, polyurethanes, phenolics, polysulfone, polyphenylene sulfide, acetal resins, polyamides, polyaramides, polyimides, polyetherimides, rubber modified polymers, thermoplastic polymer blends, and combinations thereof.

In some exemplary embodiments, the matrix polymer is an alkenyl aromatic polymer material. Suitable alkenyl aromatic polymer materials include alkenyl aromatic homopolymers and copolymers of alkenyl aromatic compounds and copolymerizable ethylenically unsaturated co-monomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer.

Examples of alkenyl aromatic polymers include, but are not limited to, those alkenyl aromatic polymers derived from alkenyl aromatic compounds such as styrene, styrene acrylonitrile (SAN) copolymers, alpha-methylstyrene, ethyl styrene, vinyl benzene, vinyl toluene, chlorostyrene, and bromostyrene. In at least one embodiment, the alkenyl aromatic polymer comprises polystyrene (PS).

In certain exemplary embodiments, minor amounts of monoethylenically unsaturated monomers such as C2 to C6 alkyl acids and esters, ionomeric derivatives, and C4 to C8 dienes may be copolymerized with alkenyl aromatic monomers to form the alkenyl aromatic polymer. Non-limiting examples of copolymerizable monomers include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate, and butadiene.

In certain exemplary embodiments, the matrix polymer may be formed entirely of polystyrene. In certain exemplary embodiments, the matrix polymer may be formed substantially of (e.g., greater than 95 wt. %) of polystyrene. In certain exemplary embodiments, the matrix polymer may be formed of from about 40-100 wt. % of polystyrene, including from about 45-99 wt. %, including from about 50-98 wt. %, including from about 55-97 wt. %, including from about 60-96 wt. %, including from about 65-95 wt. %, including from about 70-94 wt. %, including from about 75-93 wt. %, including from about 80-92 wt. %, including from about 85-91 wt. %, including from about 80-90 wt. % of polystyrene.

In certain exemplary embodiments, the polymer foam may comprise at least one optional additive including, but not limited to, antioxidants, thermal stabilizers, UV stabilizers, acid scavengers, flame retardant compositions, synergists, nucleating agents, plasticizing agents, pigments, elastomers, processing agents, extrusion aids, fillers, antistatic agents, biocides, termite-ocides, colorants, oils, or waxes. In certain exemplary embodiments, the polymer foam may comprise a mixture of additives. These optional additives may be included in amounts necessary to obtain desired characteristics of the foamable polymer mixture or resultant polymer foam. The additives may be added to the foamable polymer mixture, or they may be incorporated before, during, or after the polymerization process used to make the matrix polymer.

In certain exemplary embodiments, the polymer foam includes one or more processing aids, such as a carbonate composition. Exemplary carbonate compositions include propylene carbonate, dimethyl carbonate, butylene carbonate, ethylene carbonate, and the like. The one or more processing aids may be included in the polymer foam material in an amount from 0 to 20% by weight, including about 0.05 to about 17% by weight, about 0.1 to about 15% by weight, about 1.0 to about 10% by weight, about 1.5 to about 8% by weight, and about 2 to about 5% by weight.

Methods of Manufacture

Polymer foams comprising the blowing agent composition may be extruded foams or expanded foams. These polymer foams may be made by modifying known manufacturing methods using typical manufacturing equipment.

In some embodiments, the polymer foams of the present disclosure are extruded polymer foams made by an extrusion method. The extrusion apparatus may comprise a single or twin screw extruder including a barrel surrounding a screw on which a spiral flight is provided, configured to compress, and thereby, heat and melt the material introduced into the screw extruder. The matrix polymer and optional additives form a matrix polymer mixture, which may be fed into the screw extruder as a flowable solid, such as beads, granules, or pellets, or as a liquid or semi-liquid melt, from one or more feed hoppers.

As the matrix polymer mixture advances through the screw extruder, the decreasing spacing of the flight defines a successively smaller space through which the matrix polymer mixture is forced by the rotation of the screw. This decreasing volume acts to increase the pressure of the matrix polymer mixture to obtain a polymer melt (if solid starting material was used) and/or to increase the pressure of the polymer melt.

As the matrix polymer mixture advances through the screw extruder, a port configured for injecting one or more additives into the polymer mixture may be provided through the barrel. In some embodiments, additives such as processing aids, nucleating agents, flame retardant agents, antioxidants, or stabilizers may also be introduced to the polymer mixture through the port. Similarly, one or more additional ports may be provided through the barrel for injecting one or more blowing agent compositions into the polymer mixture. In some embodiments, one or more optional additives and blowing agent compositions are introduced through a single port. In some embodiments, optional additives and blowing agent compositions, are introduced through a plurality of ports. Once these additives and blowing agent compositions have been introduced into the matrix polymer mixture, the resulting mixture is subjected to some additional blending sufficient to distribute each of the additives generally uniformly throughout the polymer mixture to obtain an extrusion composition.

This extrusion composition is then forced through an extrusion die, and exits the die into a region of reduced pressure (which may be below atmospheric pressure), thereby allowing the blowing agent composition to expand and produce a polymer foam material. This pressure reduction may be obtained gradually as the extrusion composition advances through successively larger openings provided in the die or through some suitable apparatus provided downstream of the extrusion die for controlling to some degree the manner in which the pressure applied to the extrusion composition is reduced. The extruded and expanded polymer foam material may be subjected to additional processing such as calendaring, water immersion, cooling sprays, or other operations to control the thickness and other properties of the resulting polymer foam material.

In some embodiments, the polymer foams of the present disclosure are extruded polymer beads made by a bead extrusion method. Bead extrusion is similar to the extrusion process previously described. However, in bead extrusion, the extrusion die contains a plurality of small holes such that the extrusion composition is extruded as beads. These beads are typically in the range of about 0.05 mm to about 2.0 mm in diameter. Furthermore, the extrusion composition is not allowed to foam once the beads containing the extrusion composition exit the extrusion die. Instead, the beads containing the extrusion composition are discharged into a coolant chamber or coolant bath, and the beads are rapidly cooled to below the glass transition temperature ($T_g$) of the extrusion composition. This rapid cooling prevents the extrusion composition in the beads from foaming.

In some embodiments of bead extrusion, the matrix polymer, blowing agent composition, and optional additives are introduced to the extruder as described above to form an extrusion composition. In some embodiment of bead extrusion, the matrix polymer and optional additives are introduced to the extruder as described above to form an extrusion composition, but the blowing agent composition is added to the extruded beads via a pressure vessel after the beads have been extruded and cooled.

In some embodiments, the polymer foams of the present disclosure are expanded polymer foams made by an emulsion or suspension polymerization method. In some embodiments of expanded polymer foams, the matrix polymer is polymerized from monomer dispersed in a liquid phase within a reaction vessel. In some embodiments, a blowing agent composition is added to the polymer mixture by adding the blowing agents as diluents within the liquid phase within the reaction vessel during the polymerization reaction. In some embodiments, a blowing agent composition is used as the liquid phase within the reaction vessel during the polymerization reactions. In some embodiments, the blowing agent composition is added to the polymer mixture in a pressure vessel after the polymerization reaction has been completed.

This extrusion composition is then forced through an extrusion die and exits the die into a region of reduced pressure (which may be below atmospheric pressure), thereby allowing the blowing agent to expand and produce a polymer foam layer or slab. The polymer foam may be subjected to additional processing such as calendaring, water immersion, cooling sprays or other operations to control the thickness and other properties of the resulting polymer foam product.

Polymer Foam

The manufacturing process produces a polymer foam. In some exemplary embodiments, the manufacturing process of the foamable polymer mixture produces rigid, substantially closed cell, polymer foam boards prepared by an extruding process. Extruded foams have a cellular structure with cells defined by cell membranes and struts. Struts are formed at the intersection of the cell membranes, with the cell membranes covering interconnecting cellular windows between the struts.

In some exemplary embodiments, the foams have an average density of less than 5 pounds per cubic foot ("pcf"), or less than 4 pcf, or less than 3 pcf. In some exemplary embodiments, the polymer foam has a density from about 1 pcf to about 4.5 pcf, including from about 1.2 pcf to about 4 pcf, including from about 1.3 pcf to about 3.5 pcf, including from about 1.4 pcf to about 3 pcf, including from about 1.5 pcf to about 2.8 pcf, including from about 1.6 pcf to about 2.6 pcf, including from about 1.7 pcf to about 2.5 pcf, including from about 1.8 pcf to about 2.4 pcf, including from about 1.9 pcf to about 2.3 pcf, including from about 2.0 pcf to about 2.2 pcf. In some exemplary embodiments, the polymer foam has a density of about 2.0 pcf, or lower than 2.0 pcf.

It is to be appreciated that the phrase "substantially closed cell" is meant to indicate that the foam contains all closed cells or nearly all of the cells in the cellular structure are closed. In some embodiments, not more than 20% of the cells are open cells, and particularly, not more than 10%, or more than 5% are open cells, or otherwise "non-closed" cells. In some embodiments, from about 0.5% to about 4.0% of the cells are open cells, including from about 0.75% to about 3.5%, including from about 1.0% to about 3.2%, including from about 1.2% to about 3.0%, including from about 1.5% to about 2.8%, including from about 1.75% to about 2.5%, and including from about 2.0% to about 2.25% of the cells are open cells. The closed cell structure helps to increase the R-value of a formed, foamed insulation product. It is to be appreciated, however, that it is within the purview of the present invention to produce an open cell structure.

The average cell size of the matrix polymer cells in the inventive foam and foamed products may be from about 0.05 mm (50 µm) to about 0.4 mm (400 µm), including from about 0.1 mm (100 µm) to about 0.3 mm (300 µm), including from about 0.11 mm (110 µm) to about 0.25 mm (250 µm), including from about 0.12 mm (120 µm) to about 0.2 mm (200 µm), including from about 0.13 mm (130 µm) to about 0.18 mm (180 µm), and including from about 0.14 mm (140 µm) to about 0.16 mm (160 µm). The inventive foam may be formed into an insulation product such as a rigid insulation board, insulation foam, packaging product, and building insulation or underground insulation (for example, highway, airport runway, railway, and underground utility insulation).

The inventive foamable polymer mixture additionally may produce polymer foams that have a high compressive strength, which defines the capacity of a foam material to withstand axially directed pushing forces. In some embodiments, the inventive foam compositions have a compressive strength within the desired range for polymer foams, which is from about 6 psi and 120 psi. In some embodiments, the inventive foamable polymer mixture produces foam having a compressive strength from about 10 psi and about 110 psi, including from about 20 psi to about 100 psi, including from about 25 psi to about 90 psi, including from about 30 psi to about 80 psi, including from about 35 psi to about 70 psi, including from about 40 psi to about 60 psi, including from about 45 psi to about 50 psi.

The inventive foamable polymer mixture additionally may produce polymer foams that have a high level of dimensional stability. For example, the change in dimension in any direction is 5% or less, such as 3% or less, 2% or less, and 1.5% or less. As used herein, the average cell size is an average of the cell sizes as determined in the X, Y, and Z directions. In particular, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. In addition, further process modifications would permit increasing the Z-orientation to improve mechanical properties while still achieving an acceptable thermal property. The inventive polymer foam can be used to make insulation products such as rigid insulation boards, insulation foam, and packaging products.

Additionally, the inventive foam composition produces polymer foams that have insulation values (R-values) per inch of at least 4, or from about 4 to about 7. R-value, or total thermal resistance, is the measure of the resistance of heat transfer. The method of determining R-value is described as follows. Thermal conductivity, k, is defined as the the ratio of the heat flow per unit cross-sectional to the temperature drop per unit thickness, with the US unit:

$$k = \frac{\text{Btu} \cdot \text{in}}{hr \cdot \text{ft}^2 \cdot °\text{F.}}$$

and the metric unit:

$$k = \frac{\text{W}}{\text{m} \cdot \text{K}}$$

The heat transfer through an insulating material can occur through solid conductivity, gas conductivity, radiation, and convection. The total thermal resistance (R-value), R is the measure of the resistance to heat transfer, and is determined as:

R=t/k where t=thickness.

The thermal conductivity k, after the inventive foam has aged 7 days, is from about 0.16 to about 0.18 Btu·in/hr·ft²·° F., including from about 0.162 to about 0.178, including from about 0.164 to about 0.176, including from about 0.166 to about 0.174, including from about 0.168 to about 0.172, including about 0.170 Btu·in/hr·ft²·° F. The thermal conductivity k, after the inventive foam has aged 60 days, is from about 0.17 to about 0.185 Btu·in/hr·ft²·° F., including from about 0.172 to about 0.184, including from about 0.174 to about 0.182, including from about 0.175 to about 0.181, including from about 0.176 to about 0.180, including about 0.178 Btu·in/hr·ft²·° F.

EXAMPLES

Example 1

A series of experiments were conducted to form 1.0 inch extruded polystyrene (XPS) foam samples using various hydrocarbons as co-blowing agents with HFO-1234ze. The hydrocarbon co-blowing agents tested included n-butane, isobutane, n-pentane, isopentane, and cyclopentane. For each foam sample, the formulation comprised 98.5 wt. % polystyrene, 1 wt. % flame retardant, 0.5 wt. % infrared attenuation agent, and 7.8 wt. % blowing agent composition. The amount of each blowing agent component is given in wt. % of the total composition, and in number of moles per 100 g of matrix polymer. The blowing agent composition formulations and physical properties of each test sample are given in Tables 1-5 below.

TABLE 1

| | Foam formulations with n-butane and HFO-1234ze | | | | | | |
|---|---|---|---|---|---|---|---|
| Sample No. | HFO-1234ze (%) | HFO-1234ze (moles/ 100 g) | n-butane (%) | n-butane (moles/ 100 g) | Total BA (%) | Total BA (moles/ 100 g) | Foam Density (lb/ft³) | 7-days k-factor (Btu · in/ h · ft² · °F.) |
| A-1 | 7.55 | 0.0662 | 0.25 | 0.0043 | 7.80 | 0.0705 | 2.31 | 0.1685 |
| A-2 | 7.33 | 0.0640 | 0.50 | 0.0086 | 7.80 | 0.0726 | 2.31 | 0.1685 |
| A-3 | 7.05 | 0.0618 | 0.75 | 0.0129 | 7.80 | 0.0747 | 2.31 | 0.1679 |
| A-4 | 6.80 | 0.0596 | 1.00 | 0.0172 | 7.80 | 0.0811 | 2.32 | 0.1681 |
| A-5 | 6.30 | 0.0553 | 1.50 | 0.0258 | 7.80 | 0.0853 | 2.24 | 0.1687 |
| A-6 | 5.80 | 0.0509 | 2.00 | 0.0344 | 7.80 | 0.0853 | 2.19 | 0.1730 |

TABLE 2

| | Foam formulations with isobutane and HFO-1234ze | | | | | | |
|---|---|---|---|---|---|---|---|
| Sample No. | HFO-1234ze (%) | HFO-1234ze (moles/ 100 g) | Isobutane (%) | Isobutane (moles/ 100 g) | Total BA (%) | Total BA (moles/ 100 g) | Foam Density (lb/ft³) | 7-days k-factor (Btu · in/ h · ft² · °F.) |
| B-1 | 7.55 | 0.0662 | 0.25 | 0.0043 | 7.80 | 0.0705 | 2.24 | 0.1709 |
| B-2 | 7.33 | 0.0640 | 0.50 | 0.0086 | 7.80 | 0.0726 | 2.24 | 0.1698 |
| B-3 | 7.05 | 0.0618 | 0.75 | 0.0129 | 7.80 | 0.0747 | 2.26 | 0.1696 |
| B-4 | 6.80 | 0.0596 | 1.00 | 0.0172 | 7.80 | 0.0811 | 2.25 | 0.1689 |
| B-5 | 6.30 | 0.0553 | 1.50 | 0.0258 | 7.80 | 0.0853 | 2.21 | 0.1694 |
| B-6 | 5.80 | 0.0509 | 2.00 | 0.0344 | 7.80 | 0.0853 | 2.28 | 0.1712 |

TABLE 3

Foam formulations with n-pentane and HFO-1234ze

| Sample No. | HFO-1234ze (%) | HFO-1234ze (moles/100 g) | n-pentane (%) | n-pentane (moles/100 g) | Total BA (%) | Total BA (moles/100 g) | Foam Density (lb/ft³) | 7-days k-factor (Btu · in/ h · ft² · °F.) |
|---|---|---|---|---|---|---|---|---|
| C-1 | 7.55 | 0.0662 | 0.25 | 0.0035 | 7.80 | 0.0697 | 2.28 | 0.1656 |
| C-2 | 7.33 | 0.0640 | 0.50 | 0.0069 | 7.80 | 0.0710 | 2.22 | 0.1670 |
| C-3 | 7.05 | 0.0618 | 0.75 | 0.0104 | 7.80 | 0.0722 | 2.23 | 0.1672 |
| C-4 | 6.80 | 0.0596 | 1.00 | 0.0139 | 7.80 | 0.0735 | 2.26 | 0.1667 |
| C-5 | 6.30 | 0.0553 | 1.50 | 0.0208 | 7.80 | 0.0761 | 2.23 | 0.1679 |
| C-6 | 5.80 | 0.0509 | 2.00 | 0.0277 | 7.80 | 0.0786 | 2.22 | 0.1685 |

TABLE 4

Foam formulations with isopentane and HFO-1234ze

| Sample No. | HFO-1234ze (%) | HFO-1234ze (moles/100 g) | Iso-pentane (%) | Iso-pentane (moles/100 g) | Total BA (%) | Total BA (moles/100 g) | Foam Density (lb/ft³) | 7-days k-factor (Btu · in/ h · ft² · °F.) |
|---|---|---|---|---|---|---|---|---|
| D-1 | 7.55 | 0.0662 | 0.25 | 0.0043 | 7.80 | 0.0705 | 2.33 | 0.1677 |
| D-2 | 7.33 | 0.0640 | 0.50 | 0.0086 | 7.80 | 0.0726 | 2.25 | 0.1710 |
| D-3 | 7.05 | 0.0618 | 0.75 | 0.0129 | 7.80 | 0.0747 | 2.25 | 0.1698 |
| D-4 | 6.80 | 0.0596 | 1.00 | 0.0172 | 7.80 | 0.0811 | 2.26 | 0.1695 |
| D-5 | 6.30 | 0.0553 | 1.50 | 0.0258 | 7.80 | 0.0853 | 2.21 | 0.1673 |
| D-6 | 5.80 | 0.0509 | 2.00 | 0.0344 | 7.80 | 0.0853 | 2.21 | 0.1669 |

TABLE 5

Foam formulations with cyclopentane and HFO-1234ze

| Sample No. | HFO-1234ze (%) | HFO-1234ze (moles/100 g) | Cyclo-pentane (%) | Cyclo-pentane (moles/100 g) | Total BA (%) | Total BA (moles/100 g) | Foam Density (lb/ft³) | 7-days k-f actor (Btu · in/ h · ft² · °F.) |
|---|---|---|---|---|---|---|---|---|
| E-1 | 7.55 | 0.0662 | 0.25 | 0.0036 | 7.80 | 0.0698 | 2.28 | 0.1669 |
| E-2 | 7.33 | 0.0640 | 0.50 | 0.0071 | 7.80 | 0.0712 | 2.24 | 0.1670 |
| E-3 | 7.05 | 0.0618 | 0.75 | 0.0107 | 7.80 | 0.0725 | 2.19 | 0.1674 |
| E-4 | 6.80 | 0.0596 | 1.00 | 0.0143 | 7.80 | 0.0739 | 2.17 | 0.1673 |
| E-5 | 6.30 | 0.0553 | 1.50 | 0.0214 | 7.80 | 0.0767 | 2.21 | 0.1665 |
| E-6 | 5.80 | 0.0509 | 2.00 | 0.0285 | 7.80 | 0.0794 | 2.22 | 0.1665 |

A graph of the thermal insulation (7-days k-factor) for each foam formulation is shown in FIG. 1. For each formulation, the thermal insulation properties remain relatively constant as the amount of HFO is varied. There does not appear to be an immediate advantage to increasing the weight percent of HFO blowing agent (an expensive ingredient) relative to the hydrocarbon co-blowing agent in freshly-manufactured polymer foams.

Example 2

Figure 2:
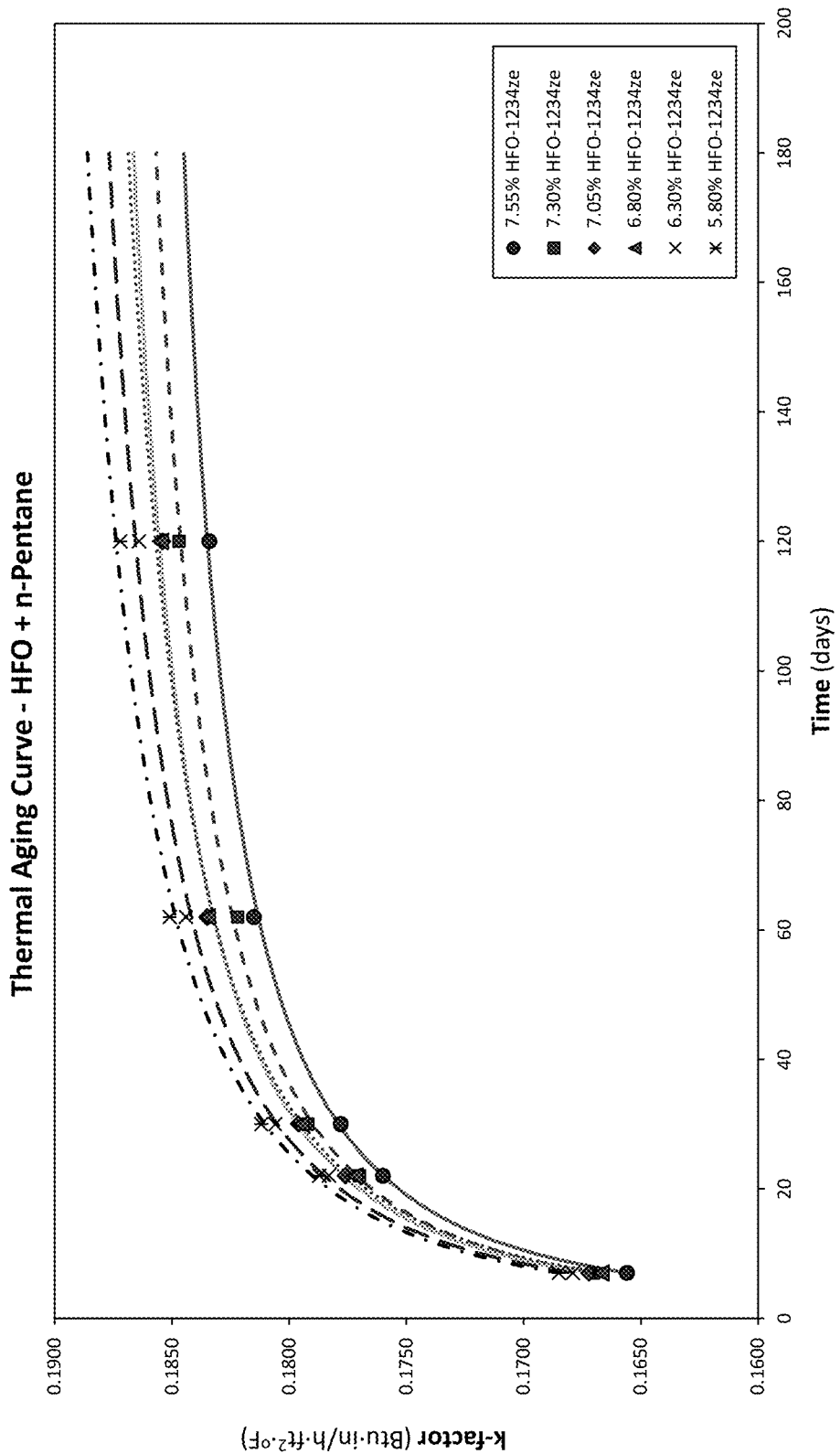
FIG. 2 is a graph of thermal insulating properties for foam formulations containing various concentrations of HFO-1234ze and n-pentane as the foams age.

The foam formulations of Example 1 were analyzed for thermal insulation properties as the samples aged. The thermal aging curves for C1-C6 (the foam formulations comprising n-pentane as the co-blowing agent) are shown in FIG. 2. Thermal aging curves for the other foam formulations of Example 1 follow the same general trends as shown in FIG. 2.

As the HFO/n-pentane foams age, the foam sample with the highest concentration of HFO (sample C-1) has slightly better thermal insulating properties than the foam samples with lower concentrations of HFO (samples C-2 to C-6). However, it should be noted that sample C-1 has about 30% more HFO than does sample C-6 (7.55 wt. % versus 5.80 wt. %), but the k-factor for C-1 at 60 days is only about 2% better than C-6 (0.181 versus 0.185). There does not appear to be a large long-term advantage as the polymer foam ages to increasing the weight percent of HFO blowing agent (an expensive ingredient) relative to the hydrocarbon co-blowing agent.

Example 3

The foam formulations from Example 1 comprising 5.8 wt. % HFO and 2.0 wt. % hydrocarbon (i.e., samples A-6, B-6, C-6, D-6, and E-6) were compared for thermal insulating properties as they aged. As a comparative example, a similar foam comprising 5.80 wt. % HFO-1234ze and 2.00 wt. % HFC-152 was also evaluated for its thermal insulating properties as it aged. The thermal aging curves for these samples are shown in FIG. 3.

The foam sample comprising HFO and isobutane (sample B-6) has the best thermal insulating properties, with a k-factor of about 0.180 Btu·in/h·ft$^2$·° F. after 60 days. The foam sample comprising HFO and isopentane (sample D-6) has the next best thermal insulating properties, with a k-factor of about 0.183 Btu·in/h·ft$^2$·° F. after 60 days. The foam samples with n-butane, n-pentane, and cyclopentane (samples A-6, C-6, and E-6, respectively) have comparable thermal insulating properties, with k-factors of about 0.184-0.185 Btu·in/h·ft$^2$·° F. after 60 days. The comparative sample (sample COMP), with HFO and HFC, has the poorest thermal insulating properties, with a k-factor of about 0.188 Btu·in/h·ft$^2$·° F. after 60 days. These results suggest that polymer foams using blowing agents comprising HFO and a branched hydrocarbon, such as isobutane or isopentane, have superior thermal insulating properties over similar foams using blowing agents comprising HFO and linear or cyclic hydrocarbons, such as n-butane, n-pentane, or cyclopentane. Additionally, polymer foams using blowing agents comprising HFO and a branched hydrocarbon, such as isobutane or isopentane, also have superior thermal insulating properties over similar foams using blowing agents comprising HFO and HFC, and excluding branched hydrocarbons.

Example 4

Figure 3:
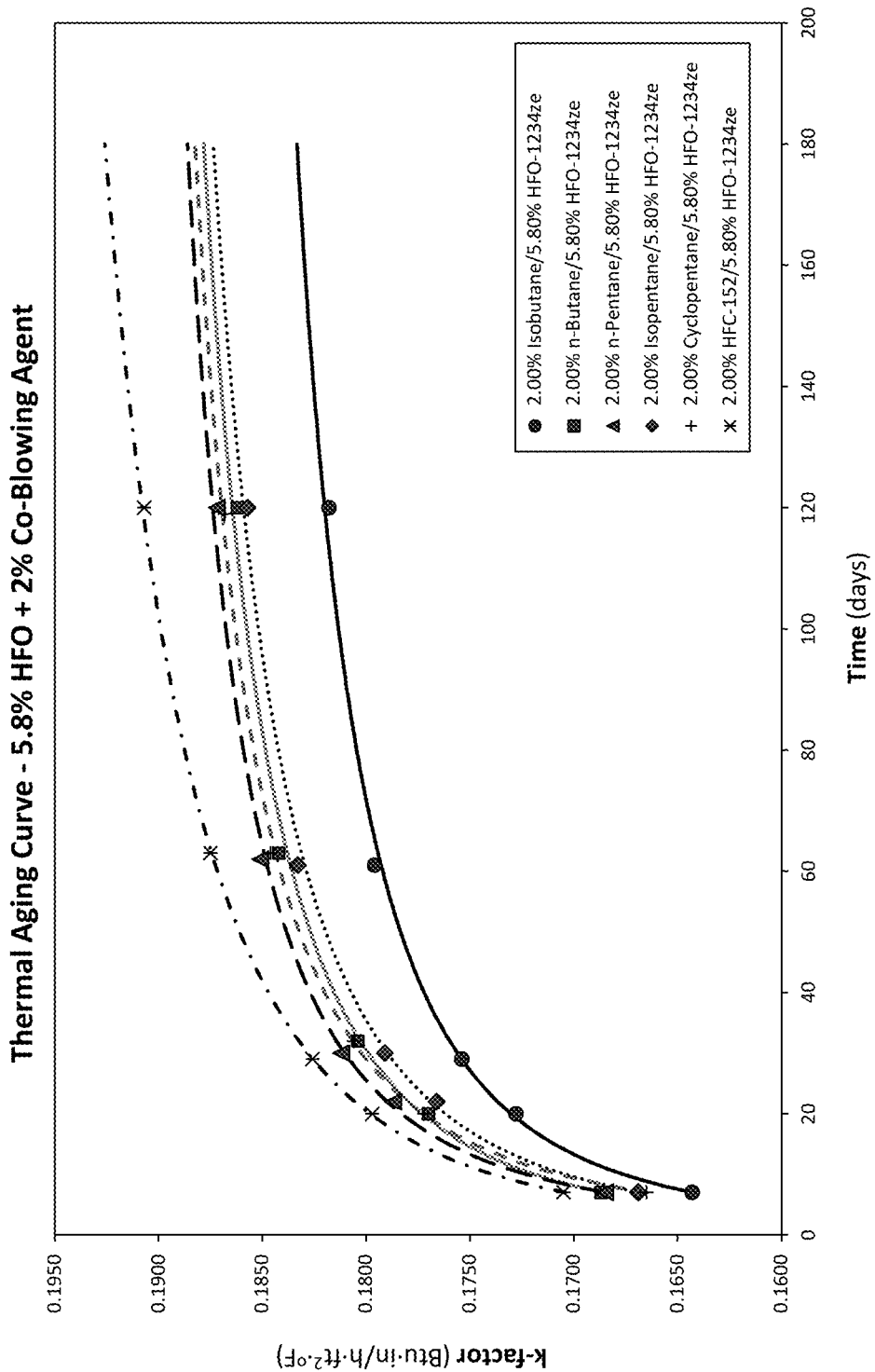
FIG. 3 is a graph of thermal insulating properties for foam formulations containing HFO-1234ze and various co-blowing agents as the foams age.
Figure 4:
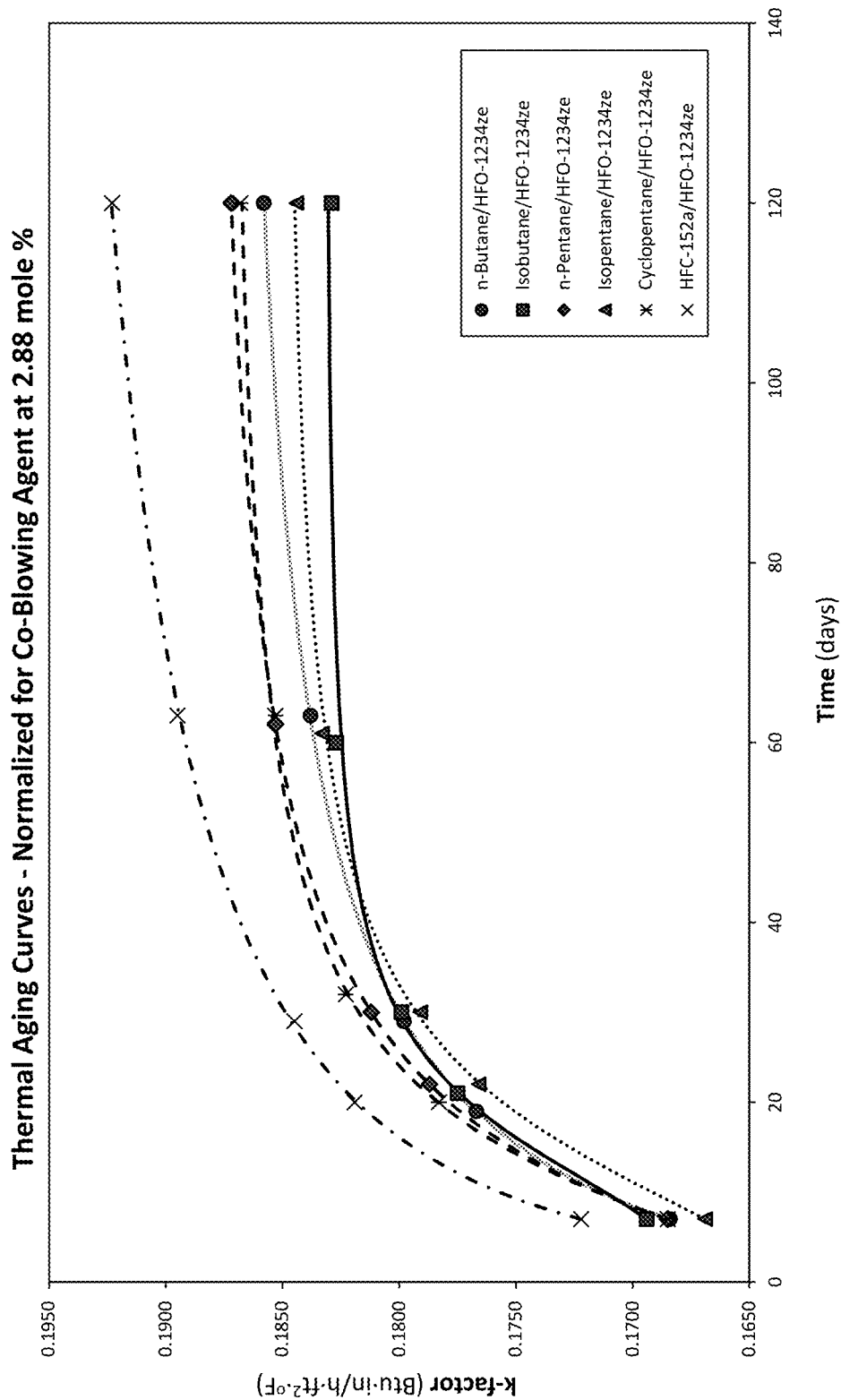
FIG. 4 is a graph of the data in FIG. 3 normalized for the mole % concentration of each co-blowing agent.

The data presented in FIG. 3 for Example 3 was normalized to compare the hydrocarbon co-blowing agents on a molar (2.88 moles/100 g matrix polymer) rather than weight (2.0 wt. %) basis in each composition. The normalized thermal aging curves are shown in FIG. 4. When normalized in this way, the foams with isopentane, isobutane, and n-butane (samples D-6, B-6, and A-6, respectively) have superior thermal insulating properties compared to the foams with n-pentane and cyclopentane (samples C-6 and E-6, respectively). The comparative sample (sample COMP), still has the poorest thermal insulating properties.

Example 5

A series of experiments were conducted to form extruded polystyrene (XPS) foam samples at the lowest possible densities, using HFO-1234ze blowing agent at 3.00 wt. % and various hydrocarbon co-blowing agents at 4.80 wt. %. The hydrocarbon co-blowing agents tested included n-butane, isobutane, n-pentane, isopentane, and cyclopentane. The thickness of the samples was held constant at 1.00 inch. For a 1.0 inch board the R-value is 5 or thermal conductivity is 0.20 Btu·in/ft$^2$·h·° F. The R-value is the inverse of the thermal conductivity. The lower the thermal conductivity the higher the R-value. As a comparative example, a similar foam comprising 3.00 wt. % HFO-1234ze and 4.80 wt. % HFC-152a was also evaluated for its thermal insulating properties as it aged. For each foam sample, the formulation comprised 98.5 wt. % polystyrene, 1 wt. % flame retardant, 0.5 wt. % infrared attenuation agent, and 7.8 wt. % blowing agent composition. The blowing agent composition formulations for each series of test samples are given in Tables 6 below.

TABLE 6

| | Foam formulations with 3.00 wt. % HFO-1234ze and 4.80 wt. % co-blowing agent | | | | | | |
|---|---|---|---|---|---|---|---|
| Sample No. | HFO-1234ze (%) | HFO-1234ze (moles/100 g) | n-butane (%) | n-butane (moles/100 g) | Isobutane (%) | Isobutane (moles/100 g) | n-pentane (%) |
| F-1 | 3.00 | 0.0263 | 4.80 | 0.0826 | — | — | — |
| F-2 | 3.00 | 0.0263 | — | — | 4.80 | 0.0826 | — |
| F-3 | 3.00 | 0.0263 | — | — | — | — | 4.80 |
| F-4 | 3.00 | 0.0263 | — | — | — | — | — |

TABLE 6-continued

Foam formulations with 3.00 wt. % HFO-1234ze and 4.80 wt. % co-blowing agent

| | | | | | | | |
|---|---|---|---|---|---|---|---|
| F-5 | 3.00 | 0.0263 | — | — | — | — | — |
| F-6 | 3.00 | 0.0263 | — | — | — | — | — |

| Sample No. | n-pentane (moles/ 100 g) | Iso-pentane (%) | Iso-pentane (moles/ 100 g) | Cyclopentane (%) | Cyclopentane (moles/ 100 g) | HFC-152a (%) | HFC-152a (moles/ 100 g) |
|---|---|---|---|---|---|---|---|
| F-1 | — | — | — | — | — | — | — |
| F-2 | — | — | — | — | — | — | — |
| F-3 | 0.0665 | — | — | — | — | — | — |
| F-4 | — | 4.80 | 0.0665 | — | — | — | — |
| F-5 | — | — | — | 4.80 | 0.0684 | — | — |
| F-6 | — | — | — | — | — | 4.80 | 0.0727 |

Figure 5:
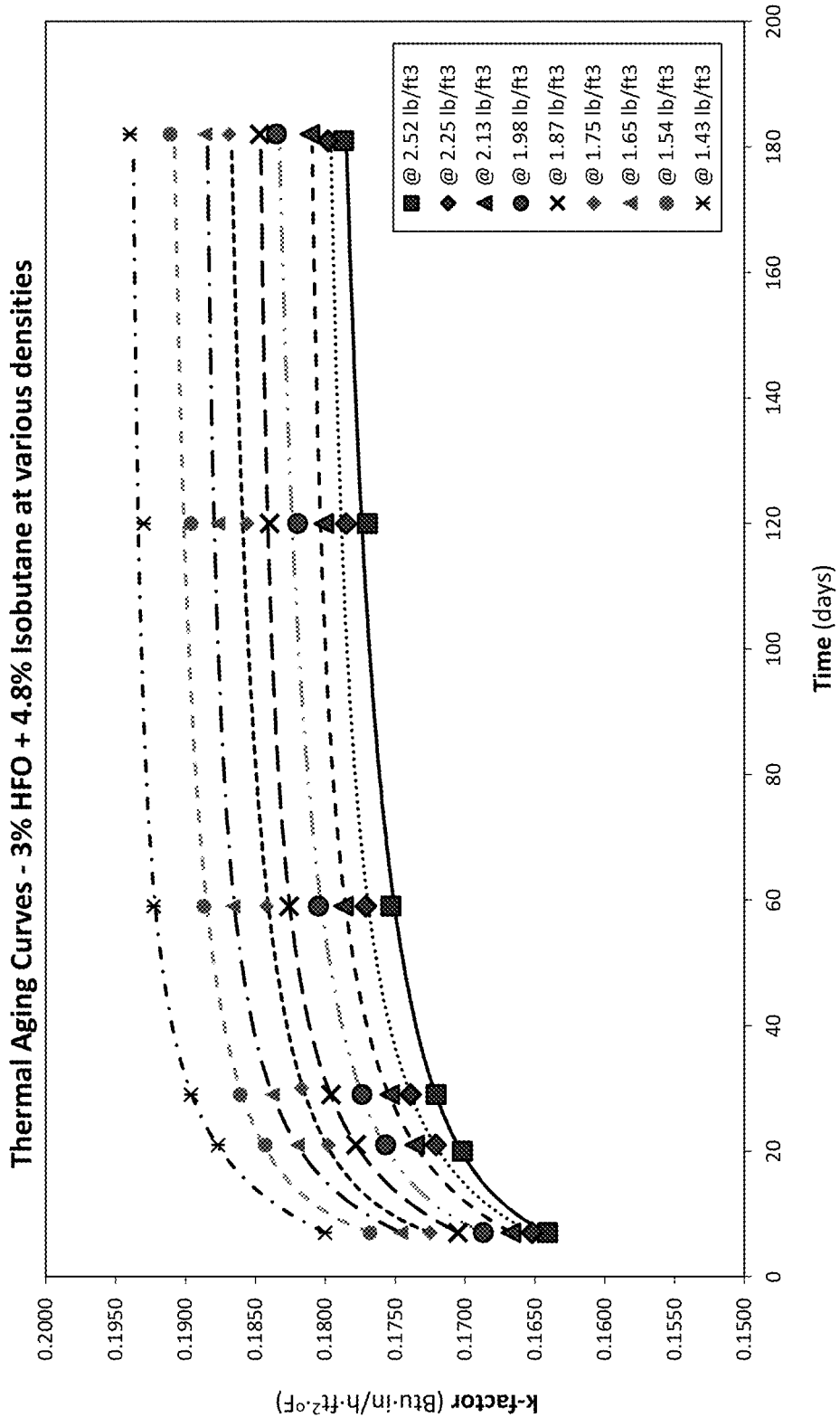
FIG. 5 is a graph of thermal insulating properties for foam formulations containing HFO-1234ze and isobutane at various densities as the foams age.

FIG. 5 shows a graph of the thermal aging curves for foams at various densities using a blowing agent of 3.00 wt. % HFO and 4.80 wt. % isobutane. The foams each included less than 0.03 moles of HFO-1234ze. The foam sample with a density of 2.52 lb/ft$^3$ has the highest thermal resistance, with a k-factor of about 0.179 Btu·in/h·ft$^2$·° F. after 180 days. However, the foams with lower densities also had acceptable thermal resistance values, with 180-day k-factors ranging from about 0.180 to about 0.194 Btu·in/h·ft$^2$·° F. for foams with densities from 2.25 to 1.43 lb/ft$^3$, respectively. As mentioned above, an R-value of 5 for a 1.0 inch board has a thermal conductivity of 0.20 Btu·in/ft$^2$·h·° F. Thus, each foam sample achieved an R-value of at least 5.

Figure 6:
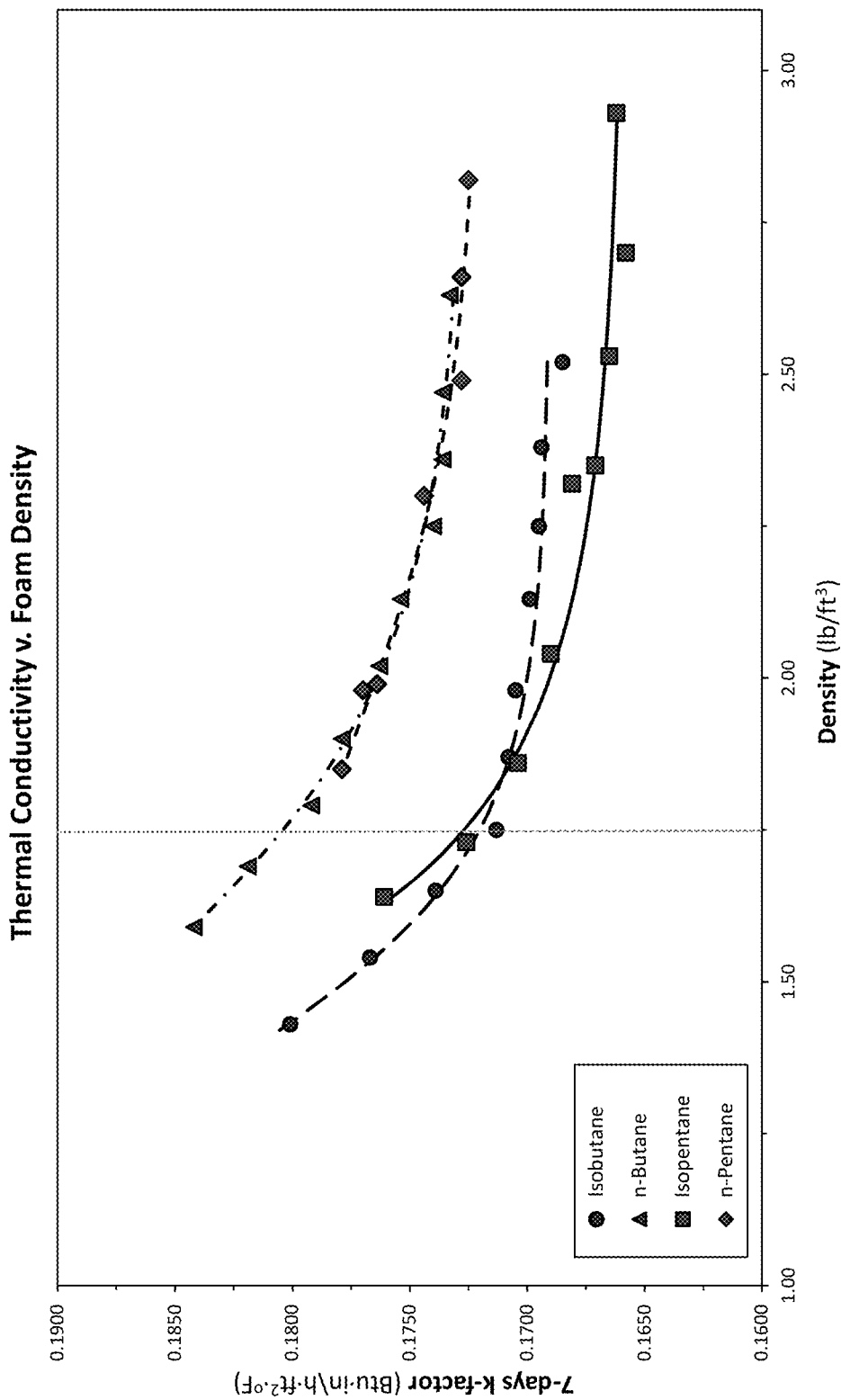
FIG. 6 is a graph of thermal insulating properties of foam formulations containing HFO-1234ze and various hydrocarbon co-blowing agents at various densities after 7 days aging.

FIG. 6 shows a graph comparing foams containing the different hydrocarbon co-blowing agents at various densities. For all foam densities, Samples F-2 and F-4, which contain the co-blowing agents isobutane and isopentane, respectively, have better thermal resistance (lower k-factors) after 7 days than do Samples F-1 and F-3, which contain n-butane and n-pentane, respectively. The dotted line at 1.75 lb/ft$^3$ density designates the target density for most commercial foams. FIG. 6 shows that foam products with densities substantially lower than 1.75 lb/ft$^3$ can have acceptable thermal resistance when isobutane or isopentane are used as co-blowing agents and an HFO as a blowing agent.

Example 6

A series of experiments were conducted to form extruded polystyrene (XPS) foam samples using various concentrations of HFO-1234ze, isobutane, and carbon dioxide. The target foam density was 2.25+/−0.05 lb/ft$^3$. The CO2 was used to maintain the total blowing agent at 7.8 wt. % of the foamable material, while the concentrations of HFO-1234ze and isobutane was varied. The ratio between the HFO and isobutane was kept constant at 1.6. For each foam sample, the formulation comprised 98.5 wt. % polystyrene, 1 wt. % flame retardant, 0.5 wt. % infrared attenuation agent, and 7.8 wt. % blowing agent composition. The amount of each blowing agent component is given in wt. % of the total composition, and in number of moles per 100 g of matrix polymer. The blowing agent composition formulations, foam density, 7-day k-factor of each sample is provided below in Table 7.

TABLE 7

Foam formulations containing various concentrations of HFO-1234ze, isobutane and carbon dioxide.

| Sample No | HFO-1234ze (%) | HFO-1234ze (moles) | isobutane (%) | isobutane (moles) | $CO_2$ (%) | $CO_2$ (moles) | Density (lb/ft$^3$) | 7-days k-factor (Btu · in/ h · ft$^2$ · °F.) |
|---|---|---|---|---|---|---|---|---|
| G-1 | 3.00 | 0.0263 | 4.80 | 0.0826 | 0.000 | 0.0000 | 2.25 | 0.1685 |
| G-2 | 2.90 | 0.0254 | 4.65 | 0.0800 | 0.125 | 0.0028 | 2.25 | 0.1694 |
| G-3 | 2.81 | 0.0246 | 4.49 | 0.0773 | 0.250 | 0.0057 | 2.25 | 0.1695 |
| G-4 | 2.71 | 0.0238 | 4.34 | 0.0747 | 0.375 | 0.0085 | 2.31 | 0.1699 |
| G-5 | 2.62 | 0.0230 | 4.18 | 0.0719 | 0.500 | 0.0114 | 2.30 | 0.1705 |
| G-6 | 2.52 | 0.0221 | 4.03 | 0.0693 | 0.625 | 0.0142 | 2.26 | 0.1708 |
| G-7 | 2.42 | 0.0212 | 3.88 | 0.0668 | 0.750 | 0.0170 | 2.24 | 0.1713 |
| G-8 | 2.33 | 0.0204 | 3.72 | 0.0640 | 0.850 | 0.0193 | 2.26 | 0.1739 |
| G-9 | 2.23 | 0.0196 | 3.57 | 0.0614 | 1.000 | 0.0227 | 2.30 | 0.1767 |
| G-10 | 1.85 | 0.0162 | 2.95 | 0.0508 | 1.500 | 0.0341 | 2.30 | 0.1801 |

Figure 7:
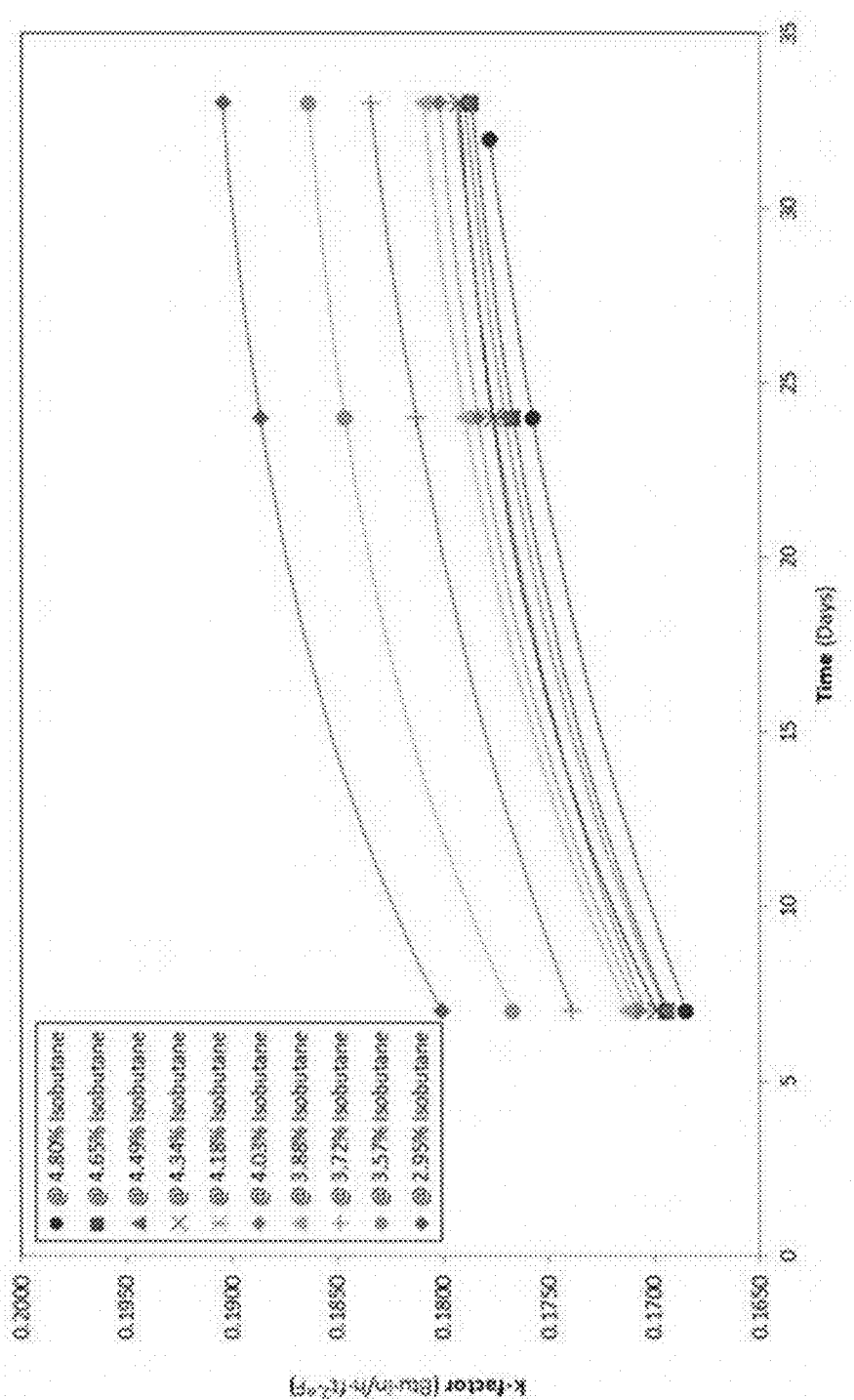
FIG. 7 is a graph of thermal insulating properties for foam formulations containing HFO-1234ze, isobutane, and carbon dioxide.

The foams thermal aging curves with various concentrations of HFO-1234ze, isobutane and carbon dioxide are shown in FIG. 7. The curves show that the thermal conductivity of the foam increases as the concentration of the HFO-1234ze and isobutane is decreased and replaced with carbon dioxide.

Although the invention has been described in the context of particular polystyrene foam materials, the inventive method is also applicable to other polymer compositions and various combinations of blending agents to obtain a variety of polymer foam materials. Example embodiments of the invention have been disclosed herein and, although specific terms are employed, they are used and are to be interpreted in a generic and descriptive sense only and not for purpose of limitation. Accordingly, it will be understood by those of ordinary skill in the art that various changes in form and details of the disclosed apparatus and methods may be made without departing from the spirit and scope of the invention as set forth in the following claims.

What is claimed is:

1. A foamable polymer composition comprising:
   a matrix polymer composition comprising polystyrene; and
   a blowing agent composition comprising:
      from 1 to 5 wt. % of a hydrofluoroolefin (HFO) blowing agent, the HFO blowing agent consisting of 1,1,1,4,4,4-hexafluoro-2-butene;
      from 0.05 to 1 wt. % of a branched hydrocarbon blowing agent, the branched hydrocarbon blowing agent consisting of isobutane; and
      from 0.05 to 5 wt. % of a hydrofluorocarbon (HFC) blowing agent, the HFC blowing agent consisting of 1,1-difluoroethane,
   wherein the foamable polymer composition contains essentially no water, and
   wherein each wt. % is based upon the total weight of the foamable polymer composition.

2. The foamable polymer composition of claim 1, wherein the blowing agent composition consists of the HFO blowing agent, the branched hydrocarbon blowing agent, and the HFC blowing agent.

3. The foamable polymer composition of claim 1, wherein the foamable composition comprises less than 0.03 moles HFO blowing agent per 100 grams of matrix polymer.

* * * * *